Patented Mar. 23, 1937

2,074,645

UNITED STATES PATENT OFFICE 2,074,645

PYRENE COMPOUNDS

Josef Ebersberger, Leverkusen-on-the-Rhine, Germany, assignor to General Aniline Works, Inc., New York, N. Y., a corporation of Delaware No Drawing. Application October 31, 1935, Serial No. 47,719. In Germany November 8, 1934

1 Claim. (Cl. 260—154)

The present invention relates to a new pyrene compound, more particularly it relates to 3.5-dihydroxypyrene which may be represented by the following formula:

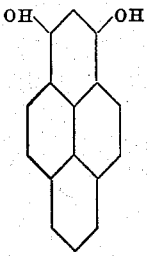

My new compound is obtainable by starting with the 3.5-dihydroxy-pyrene-8.10-disulfonic acid and splitting off the two sulfonic acid groups, for example by heating with dilute aqueous mineral acid. In this manner there is obtained in an excellent yield a new dihydroxypyrene probably having the constitution of 3.5-dihydroxypyrene, because it is not identical with the 3.8- or 3.10-dihydroxypyrene at present known.

The new 3.5-hydroxypyrene is a colorless crystalline substance insoluble in water, soluble in aqueous alkalies, and is a valuable intermediate product for the manufacture of dyestuffs.

The 3.5-dihydroxypyrene-8.10-disulfonic acid used as starting compound is obtainable by exhaustively sulfonating pyrene to the pyrene-3,5,-8,10-tetrasulfonic acid and substituting the sulfonic acid groups in the 3,5 positions by hydroxy groups, by heating in a copper crucible for about half an hour in aqueous soda lye of about 50%.

The invention is illustrated by the following examples:

(1) 150 parts by weight of 3,5-dihydroxypyrene 8,10-disodium sulfonate are heated at 130–140° C. for about 12 hours in a mixture from 1400 parts by weight of water and 275 parts by weight of concentrated sulfuric acid. In this manner there is obtained in a rather quantitative yield a new dihydroxypyrene which separates in a crystalline form and which after washing free from acid is practically pure. If necessary, the dihydroxypyrene can be purified by recrystallizing from an organic solvent. The new compound probably is the 3.5-dihydroxypyrene; its diacetyl compound melting at 155° C. is not identical with diacetyl-3.8-dihydroxypyrene and diacetyl-3.10-dihydroxypyrene having the melting point of 223–225° C. or 188–190° C. respectively.

(2) 150 parts by weight of dihydroxypyrene-disodium sulfonate are heated with 1500 parts by weight of water in an autoclave for 24 hours at 200° C., the pH-value of the solution being before heating 6.3, after heating 1.0. The dihydroxypyrene separated is filtered with suction and washed free from acid. The yield is a quantitative one.

I claim:
3.5-dihydroxypyrene of the formula:

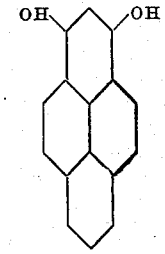

being a colorless crystalline substance insoluble in water, soluble in aqueous alkalies, and being a valuable intermediate product for the manufacture of dyestuffs.

JOSEF EBERSBERGER.